(12) United States Patent
Choi et al.

(10) Patent No.: US 10,540,415 B2
(45) Date of Patent: Jan. 21, 2020

(54) APPARATUS AND METHOD FOR MANAGING HISTORY INFORMATION IN AN ELECTRONIC DEVICE

(71) Applicant: SAMSUNG ELECTRONICS CO., LTD., Suwon-si, Gyeonggi-do (KR)

(72) Inventors: Yoonjeong Choi, Seoul (KR); Kyungtae Kim, Suwon-si (KR); Hyerim Bae, Suwon-si (KR); Sungmin Yoon, Suwon-si (KR); Jungjik Lee, Suwon-si (KR); Changho Lee, Suwon-si (KR); Changhyup Jwa, Suwon-si (KR)

(73) Assignee: Samsung Electronics Co., Ltd., Suwon-si, Gyeonggi-do (KR)

( * ) Notice: Subject to any disclaimer, the term of this patent is extended or adjusted under 35 U.S.C. 154(b) by 173 days.

(21) Appl. No.: 15/410,949

(22) Filed: Jan. 20, 2017

(65) Prior Publication Data
US 2017/0212962 A1     Jul. 27, 2017

(30) Foreign Application Priority Data
Jan. 27, 2016    (KR) .................... 10-2016-0010110

(51) Int. Cl.
    *G06F 3/0482*     (2013.01)
    *G06F 16/955*     (2019.01)
    (Continued)

(52) U.S. Cl.
    CPC ........ *G06F 16/9562* (2019.01); *G06F 3/0482* (2013.01); *G06F 17/2235* (2013.01);
    (Continued)

(58) Field of Classification Search
    CPC ........... G06F 17/30884; G06F 17/2235; G06F 3/0482; H04L 51/24
    See application file for complete search history.

(56) References Cited

U.S. PATENT DOCUMENTS

| | | | |
|---|---|---|---|
| 7,694,223 B2 * | 4/2010 | Corson | ............... G06F 9/45512 715/704 |
| 7,711,440 B1 | 5/2010 | Campbell et al. | |
| | | (Continued) | |

FOREIGN PATENT DOCUMENTS

| | | |
|---|---|---|
| KR | 10-2015-0059338 | 6/2015 |
| WO | WO 2005/008527 | 1/2005 |

OTHER PUBLICATIONS

Search Report dated Apr. 13, 2017 in counterpart International Patent Application No. PCT/KR2017/000145.

*Primary Examiner* — Anil K Bhargava
(74) *Attorney, Agent, or Firm* — Nixon & Vanderhye P.C.

(57) ABSTRACT

An apparatus and method of managing history information in an electronic device are provided. The method includes: displaying a web browser on a display, based on a first input applied to an input device; receiving data of a web page via a communication circuit; displaying the web page on the display, via the web browser; receiving a second input for creating at least one action related to the web page, via the input device; storing, in a memory, information related to at least one action, as part of a web page browsing history related to the web browser; and providing the display with at least one notification related to at least one action, using the web browser.

19 Claims, 11 Drawing Sheets

(51) Int. Cl.
  *G06F 17/22* (2006.01)
  *G06F 3/0481* (2013.01)
  *H04L 12/58* (2006.01)
  *H04L 29/08* (2006.01)
(52) U.S. Cl.
  CPC .......... *G06F 3/04817* (2013.01); *H04L 51/24* (2013.01); *H04L 67/02* (2013.01)

(56) References Cited

U.S. PATENT DOCUMENTS

| | | | |
|---|---|---|---|
| 8,090,740 | B2 | 1/2012 | Morris et al. |
| 8,704,957 | B2* | 4/2014 | Tachikawa ......... H04N 5/44582 348/734 |
| 8,914,362 | B1* | 12/2014 | Zamir ................. G06F 16/9535 707/732 |
| 2003/0018747 | A1* | 1/2003 | Herland .................. A63F 13/12 709/218 |
| 2004/0255179 | A1 | 12/2004 | Mayer |
| 2004/0261026 | A1* | 12/2004 | Corson ............... G06F 9/45512 715/704 |
| 2005/0234940 | A1* | 10/2005 | Apparao ............. G06F 16/9562 |
| 2006/0015509 | A1 | 1/2006 | Naitou |
| 2006/0069612 | A1 | 3/2006 | Hurt et al. |
| 2007/0146160 | A1* | 6/2007 | Takeshita ............... G08C 23/04 340/13.24 |
| 2009/0100021 | A1* | 4/2009 | Morris .................. G06F 16/955 |
| 2011/0202847 | A1* | 8/2011 | Dimitrov ............. G06F 3/0481 715/738 |
| 2012/0198026 | A1* | 8/2012 | Roy .................... G06Q 30/0641 709/218 |
| 2013/0275493 | A1* | 10/2013 | Chan ................... G06F 16/955 709/203 |
| 2014/0082468 | A1 | 3/2014 | May |
| 2014/0156648 | A1 | 6/2014 | Liu et al. |
| 2014/0236918 | A1 | 8/2014 | Cohen et al. |
| 2015/0007065 | A1* | 1/2015 | Krishnamoorthy ..... H04L 67/22 715/760 |
| 2017/0085658 | A1* | 3/2017 | Todd ..................... H04L 67/306 |

* cited by examiner

FIG. 8

| ADDRESS | ACCESS TIME | VISIT DURATION | LINK PROGRAM | OPERATION | Linkify |
|---|---|---|---|---|---|
| www.samsung.com | 2015-11-16; PM 02: 45 | 0h 15m 20s | KKA TALK | COPY | PHONE NUMBER ADDRESS |
| ... | ... | ... | ... | ... | ... |

FIG. 11

| DETAILED SEARCH | | | | | | |
|---|---|---|---|---|---|---|
| ACCESS TIME | ☑ TUE | ☐ MON | ☐ LAST WEEK | ☐ 2 WEEKS AGO | ☐ 3 WEEKS AGO | ☐ LAST MONTH | ☐ OLD ITEM |
| VISITS: | ☑ ONCE | ☐ MORE THAN 5 | ☐ MORE THAN 10 | ☐ MORE THAN 20 | | |
| VISIT DURATION | ☑ MORE THAN 5 MINS | ☑ MORE THAN 10 MINS | ☐ MORE THAN 30 MINS | ☐ MORE THAN 1 HOUR | ☐ MORE THAN 2 HOURS | |
| LINK PROGRAM | ☑ PROGRAM 1 | ☐ PROGRAM 2 | ☐ PROGRAM 3 | ☐ PROGRAM 4 | | |
| USER ACTION | ☑ COPY | ☐ CAPTURE | ☐ BOOKMARK | ☐ SHARE | ☐ TRANSMIT | |
| LINKIFY | ☑ ADDRESS | ☐ PHONE NUMBER | ☐ EMAIL | ☐ USER SPECIFIED PASSAGES | | |

APPARATUS AND METHOD FOR MANAGING HISTORY INFORMATION IN AN ELECTRONIC DEVICE

CROSS-REFERENCE TO RELATED APPLICATION

This application is based on and claims priority under 35 U.S.C. § 119 to a Korean patent application filed on Jan. 27, 2016, in the Korean Intellectual Property Office and assigned Serial No. 10-2016-0010110, the disclosure of which is incorporated by reference herein in its entirety.

BACKGROUND

1. Field

The present disclosure relates generally to an apparatus and method of managing history information in an electronic device.

2. Description of Related Art

Electronic devices with an Internet access function are capable of providing a history management function. The history management function enables electronic devices to store information related to websites that users have browsed using web browsers.

Conventional web browsers record a history of websites in the order that users browsed, i.e., in time order. When a user needs to search for a web page from the web pages that he/she has browsed, he/she has difficulty searching for it without knowing the date when he/she accessed it.

SUMMARY

The present disclosure addresses the above problems and disadvantages. Various example embodiments of the present disclosure provide an apparatus and method that manages history information in an electronic device, for easily searching for a history on web browsers and increasing user convenience.

In accordance with an example aspect of the present disclosure, an electronic device is provided. The electronic device includes: a communication circuit; a display; an input device comprising input circuitry configured with the display or separated from the display; a processor electrically connected to the communication circuit, the display, and the input circuitry; and a memory, electrically connected to the processor, for storing instructions and a program for a web-browser. The memory stores instructions which, when executed by the processor, cause the processor to perform operations comprising: displaying the web browser on the display, based on a first input applied to the input circuitry of the device; receiving data of a web page via the communication circuit; displaying the web page on the display, via the web browser; receiving a second input for creating at least one action related to the web page, via the input device; storing, in the memory, information related to at least one action, as part of a web page browsing history related to the web browser; and providing the display with at least one notification related to at least one action, using the web browser.

In accordance with another example aspect of the present disclosure, a method of managing history information in an electronic device is provided. The method includes: displaying a web browser on a display, based on a first input applied to an input device; receiving data of a web page via a communication circuit; displaying the web page on the display, via the web browser; receiving a second input for creating at least one action related to the web page, via the input device; storing, in a memory, information related to at least one action, as part of a web page browsing history related to the web browser; and providing the display with at least one notification related to at least one action, using the web browser.

BRIEF DESCRIPTION OF THE DRAWINGS

The above and other aspects, features and attendant advantages of the present disclosure will be more readily apparent from the following detailed description, taken in conjunction with the accompanying drawings, in which like reference numerals refer to like elements, and wherein:

FIG. 8 is a diagram illustrating an example method of storing a history of a web page in an electronic device according to an example embodiment of the present disclosure;

FIG. 11 is a diagram illustrating an electronic device providing a history search function, according to an example embodiment of the present disclosure.

DETAILED DESCRIPTION

Figure 1:
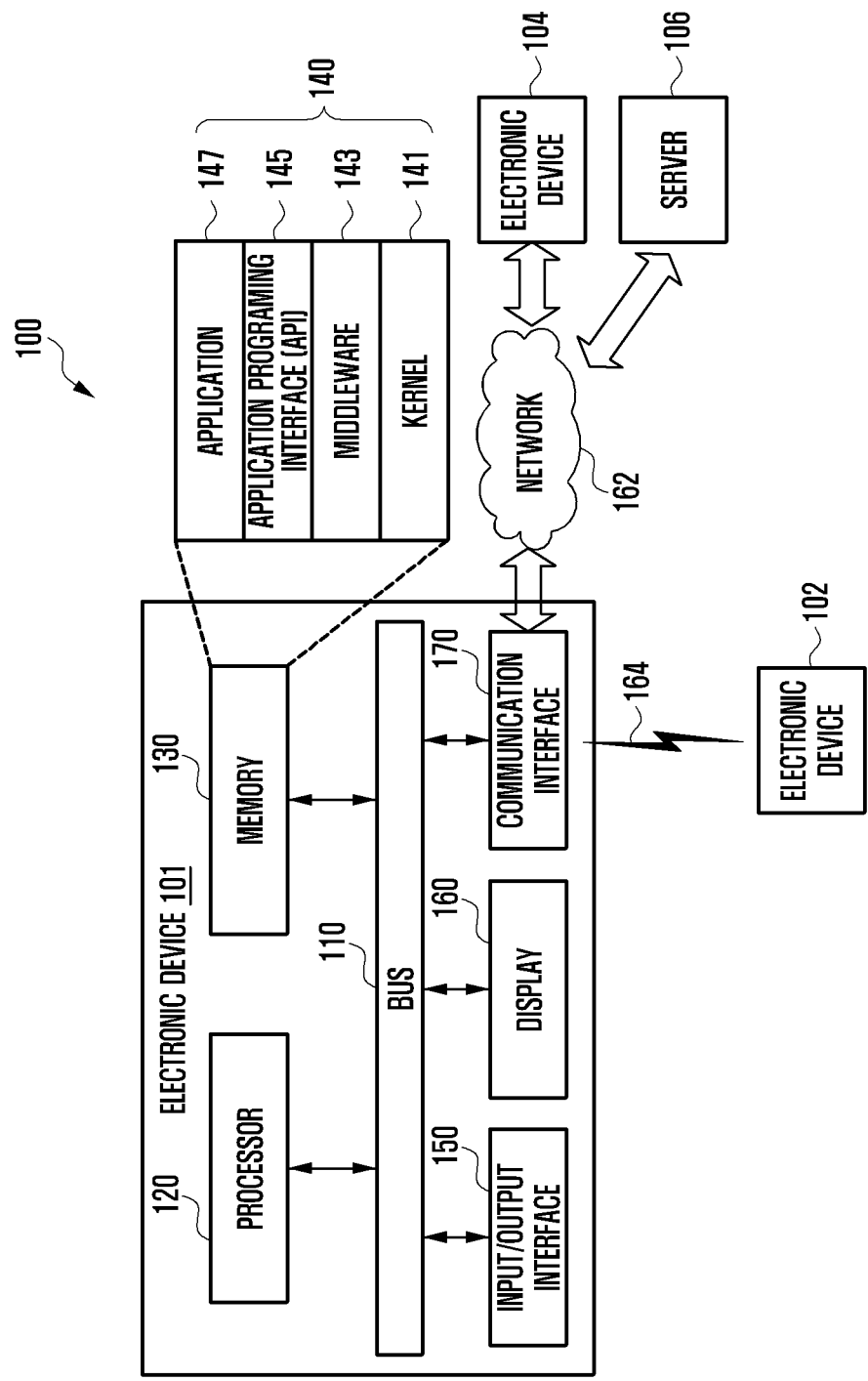
FIG. 1 is a diagram illustrating an example network environment including an electronic device according to various example embodiments of the present disclosure.

The following description is provided with reference to the accompanying drawings to assist in understanding the various example embodiments of the present disclosure as defined by the claims and their equivalents. It includes various example details to assist in that understanding but these are to be regarded as merely examples. Accordingly, those of ordinary skill in the art will recognize that various changes and modifications of the various example embodiments described herein can be made without departing from the scope and spirit of the present disclosure. In addition, descriptions of well-known functions and constructions may be omitted for clarity and conciseness.

The terms and words used in the following disclosure and claims are not limited to the bibliographical meanings, but, are merely used to enable a clear and consistent understanding of the present disclosure. Accordingly, it should be apparent to those skilled in the art that the following description of various example embodiments of the present disclosure is provided for illustration purpose only and not for the purpose of limiting the present disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces. The expressions such as "include" and "may include" may denote the presence of the disclosed functions, operations, and constituent elements and do not limit one or more additional functions, operations, and constituent elements. Terms such as "include" and/or "have" may be understood to denote a certain characteristic, number, operation, constituent element, component or a combination thereof, but may not be understood to exclude the existence of or a possibility of addition of one or more other characteristics, numbers, operations, constituent elements, components or combinations thereof.

Furthermore, in the present disclosure, the expression "and/or" includes any and all combinations of the associated listed words. For example, the expression "A and/or B" may include A, may include B, or may include both A and B.

In the present disclosure, expressions including ordinal numbers, such as "first" and "second," etc., may modify various elements. However, such elements are not limited by the above expressions. For example, the above expressions do not limit the sequence and/or importance of the elements. The above expressions are used merely for the purpose to distinguish an element from the other elements. For example, a first user device and a second user device indicate different user devices although both of them are user devices. For example, a first element could be termed a second element, and similarly, a second element could be also termed a first element without departing from the scope of the present disclosure.

In the case where a component is referred to as being "connected" or "accessed" to other component, it should be understood that not only the component is directly connected or accessed to the other component, but also there may exist another component between them. Meanwhile, in the case where a component is referred to as being "directly connected" or "directly accessed" to other component, it should be understood that there is no component therebetween. The terms used in the present disclosure are only used to describe various example embodiments, and are not intended to limit the present disclosure. As used herein, the singular forms are intended to include the plural forms as well, unless the context clearly indicates otherwise. Singular forms are intended to include plural forms unless the context clearly indicates otherwise.

An electronic device according to the present disclosure may be a device including a communication function. For example, the device corresponds to a combination of at least one of a smartphone, a tablet Personal Computer (PC), a mobile phone, a video phone, an e-book reader, a desktop PC, a laptop PC, a netbook computer, a Personal Digital Assistant (PDA), a Portable Multimedia Player (PMP), a digital audio player, a mobile medical device, an electronic bracelet, an electronic necklace, an electronic accessory, a camera, a wearable device, an electronic clock, a wrist watch, home appliances (for example, an air-conditioner, vacuum, an oven, a microwave, a washing machine, an air cleaner, and the like), an artificial intelligence robot, a television (TV), a Digital Video Disk (DVD) player, an audio device, various medical devices (for example, Magnetic Resonance Angiography (MRA), Magnetic Resonance Imaging (MRI), Computed Tomography (CT), a scanning machine, a ultrasonic wave device, or the like), a navigation device, a Global Positioning System (GPS) receiver, an Event Data Recorder (EDR), a Flight Data Recorder (FDR), a set-top box, a TV box (for example, Samsung HomeSync™, Apple TV™, or Google TV™), an electronic dictionary, vehicle infotainment device, an electronic equipment for a ship (for example, navigation equipment for a ship, gyrocompass, or the like), avionics, a security device, electronic clothes, an electronic key, a camcorder, game consoles, a Head-Mounted Display (HMD), a flat panel display device, an electronic frame, an electronic album, furniture or a portion of a building/structure that includes a communication function, an electronic board, an electronic signature receiving device, a projector, or the like, but is not limited thereto. It will be apparent to those skilled in the art that the electronic device according to the present disclosure is not limited to the aforementioned devices.

FIG. 1 is a block diagram illustrating an example configuration of an electronic device in a network environment 100 according to an example embodiment of the present disclosure.

Referring to FIG. 1, the electronic device 101 may include a bus 110, a processor (e.g., including processing circuitry) 120, a memory 130, an input/output interface (e.g., including input/output circuitry) 150, a display 160, a communication interface (e.g., including communication circuitry) 170, and other similar and/or suitable components.

The bus 110 may be a circuit which interconnects the above-described elements and delivers a communication (e.g., a control message) between the above-described elements.

The processor 120 may include various processing circuitry configured of receive commands from the above-described other elements (e.g., the memory 130, the input/output interface 150, the display 160, the communication interface 170, etc.) through the bus 110, may interpret the received commands, and may execute calculation or data processing according to the interpreted commands.

The memory 130 may store commands or data received from the processor 120 or other elements (e.g., the input/output interface, the display 160, the communication interface 170, etc.) or generated by the processor 120 or the other elements. The memory 130 may include various programming modules 140, which may include, for example, a kernel 141, middleware 143, an Application Programming Interface (API) 145, an application 147, and the like. Each of the above-described programming modules may be implemented in software, firmware, hardware, or a combination of two or more thereof.

The kernel 141 may control or manage system resources (e.g., the bus 110, the processor 120, the memory 130, etc.) used to execute operations or functions implemented by other programming modules (e.g., the middleware 143, the API 145, and the application 147). Also, the kernel 141 may provide an interface capable of accessing and controlling or managing the individual elements of the electronic device 100 by using the middleware 143, the API 145, or the application 147.

The middleware 143 may serve to go between the API 145 or the application 147 and the kernel 141 in such a manner that the API 145 or the application 147 communicates with the kernel 141 and exchanges data therewith. Also, in relation to work requests received from one or more applications 147 and/or the middleware 143, for example, may perform load balancing of the work requests by using a method of assigning a priority, in which system resources (e.g., the bus 110, the processor 120, the memory 130, etc.) of the electronic device 100 can be used, to at least one of the one or more applications 134.

The API 145 is an interface through which the application 147 is capable of controlling a function provided by the kernel 141 or the middleware 143, and may include, for example, at least one interface or function for file control, window control, image processing, character control, or the like.

The input/output interface 150, for example, may include various input/output circuitry configured to receive a command or data as input from a user, and may deliver the received command or data to the processor 120 or the memory 130 through the bus 110. The display 160 may display a video, an image, data, or the like to the user.

The communication interface 170 may include various communication circuitry configured to connect communication between another electronic device 102 and the electronic device 101. The communication interface 170 may support a predetermined short-range communication protocol (e.g., Wi-Fi, BlueTooth (BT), and Near Field Communication (NFC)) for short range communication 164, or predetermined network communication 162 (e.g., the Internet, a Local Area Network (LAN), a Wide Area Network (WAN), a telecommunication network, a cellular network, a satellite network, a Plain Old Telephone Service (POTS), or the like). Each of the electronic devices 102 and 104 may be a device which is identical (e.g., of an identical type) to or different (e.g., of a different type) from the electronic device 100. Further, the communication interface 170 may connect communication between a server 106 and the electronic device 101 via the network 162.

Figure 2:
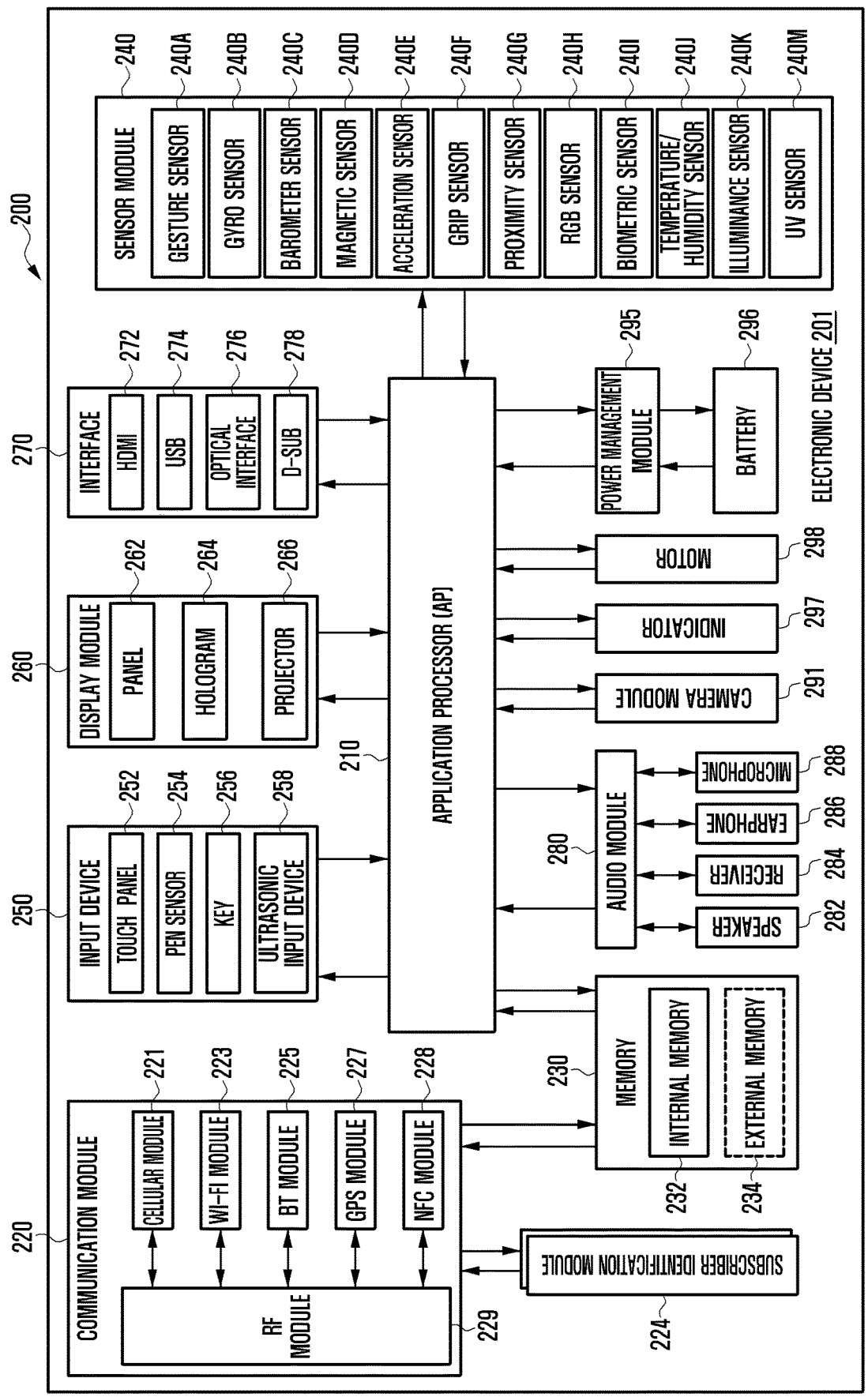
FIG. 2 is a block diagram illustrating an example electronic device according to various example embodiments of the present disclosure.

FIG. 2 is a block diagram 200 illustrating an example configuration of an electronic device 201 according to an example embodiment of the present disclosure.

The hardware 200 may be, for example, the electronic device 101 illustrated in FIG. 1.

Referring to FIG. 2, the electronic device may include one or more processors (e.g., including processing circuitry) 210, a communication module (e.g., including communication circuitry) 220, a Subscriber Identification Module (SIM) card 224, a memory 230, a sensor module 240, a input device (e.g., including input circuitry) 250, a display module 260, an interface (e.g., including interface circuitry) 270, an audio module 280, a camera module 291, a power management module 295, a battery 296, an indicator 297, a motor 298 and any other similar and/or suitable components.

The Application Processor (AP) 210 (e.g., the processor 120) may include one or more Application Processors (APs), or one or more Communication Processors (CPs). The processor 210 may be, for example, the processor 120 illustrated in FIG. 1. The AP 210 is illustrated as being included in the processor 210 in FIG. 2, but may be included in different Integrated Circuit (IC) packages, respectively. According to an embodiment of the present disclosure, the AP 210 may be included in one IC package.

The AP 210 may execute an Operating System (OS) or an application program, and thereby may control multiple hardware or software elements connected to the AP 210 and may perform processing of and arithmetic operations on various data including multimedia data. The AP 210 may be implemented by various processing circuitry, such as, for example, and without limitation, a dedicated processor, a CPU, or the like, and may be implemented in various forms, such as, for example, a System on Chip (SoC). According to an example embodiment of the present disclosure, the AP 210 may further include a Graphical Processing Unit (GPU) (not illustrated).

The AP 210 may manage a data line and may convert a communication protocol in the case of communication between the electronic device (e.g., the electronic device 100) including the hardware 200 and different electronic devices connected to the electronic device through the network. The AP 210 may be implemented by, for example, an SoC. According to an embodiment of the present disclosure, the AP 210 may perform at least some of multimedia control functions. The AP 210, for example, may distinguish and authenticate a terminal in a communication network by using a subscriber identification module (e.g., the SIM card 224). Also, the AP 210 may provide the user with services, such as a voice telephony call, a video telephony call, a text message, packet data, and the like.

Further, the AP 210 may control the transmission and reception of data by the communication module 220. In FIG. 2, the elements such as the AP 220, the power management module 295, the memory 230, and the like are illustrated as elements separate from the AP 210. However, according to an example embodiment of the present disclosure, the AP 210 may include at least some (e.g., the CP) of the above-described elements.

According to an example embodiment of the present disclosure, the AP 210 may load, to a volatile memory, a command or data received from at least one of a non-volatile memory and other elements connected to each of the AP 210, and may process the loaded command or data. Also, the AP 210 may store, in a non-volatile memory, data received from or generated by at least one of the other elements.

The SIM card 224 may be a card implementing a subscriber identification module, and may be inserted into a slot formed in a particular portion of the electronic device 100. The SIM card 224 may include unique identification information (e.g., Integrated Circuit Card IDentifier (ICCID)) or subscriber information (e.g., International Mobile Subscriber Identity (IMSI)).

The memory 230 may include an internal memory 232 and/or an external memory 234. The memory 230 may be, for example, the memory 130 illustrated in FIG. 1. The internal memory 232 may include, for example, at least one of a volatile memory (e.g., a Dynamic RAM (DRAM), a Static RAM (SRAM), a Synchronous Dynamic RAM (SDRAM), etc.), and a non-volatile memory (e.g., a One Time Programmable ROM (OTPROM), a Programmable ROM (PROM), an Erasable and Programmable ROM (EPROM), an Electrically Erasable and Programmable ROM (EEPROM), a mask ROM, a flash ROM, a Not AND (NAND) flash memory, a Not OR (NOR) flash memory, etc.). According to an embodiment of the present disclosure, the internal memory 232 may be in the form of a Solid State Drive (SSD). The external memory 234 may further include a flash drive, for example, a Compact Flash (CF), a Secure Digital (SD), a Micro-Secure Digital (Micro-SD), a Mini-Secure Digital (Mini-SD), an extreme Digital (xD), a memory stick, or the like.

The communication module 220 may include various communication circuitry, such as, for example, and without limitation, one or more of a cellular module 221, a wireless communication module 223 or a Radio Frequency (RF) module 229. The communication module 220 may be, for example, the communication interface 170 illustrated in FIG. 1. The communication module 220 may include various communication circuitry, for example, a Wi-Fi part 223, a BT part 225, a GPS part 227, or a NFC part 229. For example, the wireless communication module 220 may provide a wireless communication function by using a radio frequency. Additionally or alternatively, the wireless communication module 220 may include a network interface (e.g., a LAN card), a modulator/demodulator (modem), or the like for connecting the hardware 200 to a network (e.g., the Internet, a LAN, a WAN, a telecommunication network, a cellular network, a satellite network, a POTS, or the like).

The RF module 229 may be used for transmission and reception of data, for example, transmission and reception of RF signals or called electronic signals. Although not illustrated, the RF unit 229 may include, for example, a transceiver, a Power Amplifier Module (PAM), a frequency filter, a Low Noise Amplifier (LNA), or the like. Also, the RF module 229 may further include a component for transmitting and receiving electromagnetic waves in a free space in a wireless communication, for example, a conductor, a conductive wire, or the like.

The sensor module 240 may include, for example, at least one of a gesture sensor 240A, a gyro sensor 240B, an barometer sensor 240C, a magnetic sensor 240D, an acceleration sensor 240E, a grip sensor 240F, a proximity sensor 240G, a Red, Green and Blue (RGB) sensor 240H, a biometric sensor 240I, a temperature/humidity sensor 240J, an illuminance sensor 240K, and a Ultra Violet (UV) sensor 240M. The sensor module 240 may measure a physical quantity or may sense an operating state of the electronic device 100, and may convert the measured or sensed information to an electrical signal. Additionally/alternatively, the sensor module 240 may include, for example, an E-nose sensor (not illustrated), an ElectroMyoGraphy (EMG) sensor (not illustrated), an ElectroEncephaloGram (EEG) sensor (not illustrated), an ElectroCardioGram (ECG) sensor (not illustrated), a fingerprint sensor (not illustrated), and the like. Additionally or alternatively, the sensor module 240 may include, for example, an E-nose sensor (not illustrated), an EMG sensor (not illustrated), an EEG sensor (not illustrated), an ECG sensor (not illustrated), a fingerprint sensor, and the like. The sensor module 240 may further include a control circuit (not illustrated) for controlling one or more sensors included therein.

The input device 250 may include various input circuitry, such as, for example, and without limitation, one or more of a touch panel 252, a pen sensor 254 (e.g., a digital pen sensor), keys 256, and an ultrasonic input unit 258. The input device 250 may be, for example, the input/output interface 150 illustrated in FIG. 1. The touch panel 252 may recognize a touch input in at least one of, for example, a capacitive scheme, a resistive scheme, an infrared scheme, and an acoustic wave scheme. Also, the touch panel 252 may further include a controller (not illustrated). In the capacitive type, the touch panel 252 is capable of recognizing proximity as well as a direct touch. The touch panel 252 may further include a tactile layer (not illustrated). In this event, the touch panel 252 may provide a tactile response to the user.

The pen sensor 254 (e.g., a digital pen sensor), for example, may be implemented by using a method identical or similar to a method of receiving a touch input from the user, or by using a separate sheet for recognition. For example, a key pad or a touch key may be used as the keys 256. The ultrasonic input unit 258 enables the terminal to sense a sound wave by using a microphone (e.g., a microphone 288) of the terminal through a pen generating an ultrasonic signal, and to identify data. The ultrasonic input unit 258 is capable of wireless recognition. According to an embodiment of the present disclosure, the hardware 200 may receive a user input from an external device (e.g., a network, a computer, or a server), which is connected to the communication module 230, through the communication module 230.

The display module 260 may include a panel 262, a hologram 264, or projector 266. The display module 260 may be, for example, the display module 150 illustrated in FIG. 1. The panel 262 may be, for example, a Liquid Crystal Display (LCD) and an Active Matrix Organic Light Emitting Diode (AM-OLED) display, and the like. The panel 262 may be implemented so as to be, for example, flexible, transparent, or wearable. The panel 262 may include the touch panel 252 and one module. The hologram 264 may display a three-dimensional image in the air by using interference of light. According to an embodiment of the present disclosure, the display module 260 may further include a control circuit for controlling the panel 262 or the hologram 264.

The interface 270 may include various interface circuitry, such as, for example, and without limitation, one or more of a High-Definition Multimedia Interface (HDMI) 272, a Universal Serial Bus (USB) 274, an optical interface 276, and a D-subminiature (D-sub) 278. Additionally or alternatively, the interface 270 may include, for example, SD/Multi-Media Card (MMC) (not illustrated) or Infrared Data Association (IrDA) (not illustrated).

The audio module 280 may include, for example, an audio codec configured to bidirectionally convert between a voice and an electrical signal. The audio codec may convert voice information, which is input to or output from the audio module 280, through, for example, a speaker 282, a receiver 284, an earphone 286, the microphone 288 or the like.

The camera module 291 may capture an image and a moving image. According to an embodiment, the camera module 291 may include one or more image sensors (e.g., a front lens or a back lens), an Image Signal Processor (ISP) (not illustrated), and a flash LED (not illustrated).

The power management module 295 may manage power of the hardware 200. Although not illustrated, the power management module 295 may include, for example, a Power Management Integrated Circuit (PMIC), a charger Integrated Circuit (IC), or a battery fuel gauge.

The PMIC may be mounted to, for example, an IC or a SoC semiconductor. Charging methods may be classified into a wired charging method and a wireless charging method. The charger IC may charge a battery, and may prevent an overvoltage or an overcurrent from a charger to the battery. According to an embodiment of the present disclosure, the charger IC may include a charger IC for at least one of the wired charging method and the wireless charging method. Examples of the wireless charging method may include a magnetic resonance method, a magnetic induction method, an electromagnetic method, and the like. Additional circuits (e.g., a coil loop, a resonance circuit, a rectifier, etc.) for wireless charging may be added in order to perform the wireless charging.

The battery fuel gauge may measure, for example, a residual quantity of the battery 296, or a voltage, a current or a temperature during the charging. The battery 296 may supply power by generating electricity, and may be, for example, a rechargeable battery.

The indicator 297 may indicate particular states of the hardware 200 or a part (e.g., the AP 211) of the hardware 200, for example, a booting state, a message state, a charging state and the like. The motor 298 may convert an electrical signal into a mechanical vibration. The processor 210 may control the sensor module 240.

Although not illustrated, the hardware 200 may include a processing unit (e.g., a GPU) for supporting a module TV. The processing unit for supporting a module TV may process media data according to standards such as, for example, Digital Multimedia Broadcasting (DMB), Digital Video Broadcasting (DVB), media flow, and the like. Each of the above-described elements of the hardware 200 according to an embodiment of the present disclosure may include one or more components, and the name of the relevant element may change depending on the type of electronic device. The hardware 200 according to an embodiment of the present disclosure may include at least one of the above-described elements. Some of the above-described elements may be omitted from the hardware 200, or the hardware 200 may further include additional elements. Also, some of the elements of the hardware 200 according to an embodiment of the present disclosure may be combined into one entity, which may perform functions identical to those of the relevant elements before the combination.

The term "module" used in the present disclosure may refer to, for example, a unit including one or more combinations of hardware, software, and firmware. The "module" may be interchangeable with a term, such as "unit," "logic," "logical block," "component," "circuit," or the like. The "module" may be a minimum unit of a component formed as one body or a part thereof. The "module" may be a minimum unit for performing one or more functions or a part thereof. The "module" may be implemented mechanically or electronically. For example, the "module" according to an example embodiment of the present disclosure may include various processing circuitry, such as, at least one of a dedicated processor, a CPU, an Application-Specific Integrated Circuit (ASIC) chip, a Field-Programmable Gate Array (FPGA), and a programmable-logic device for performing certain operations which have been known or are to be developed in the future.

Figure 3:
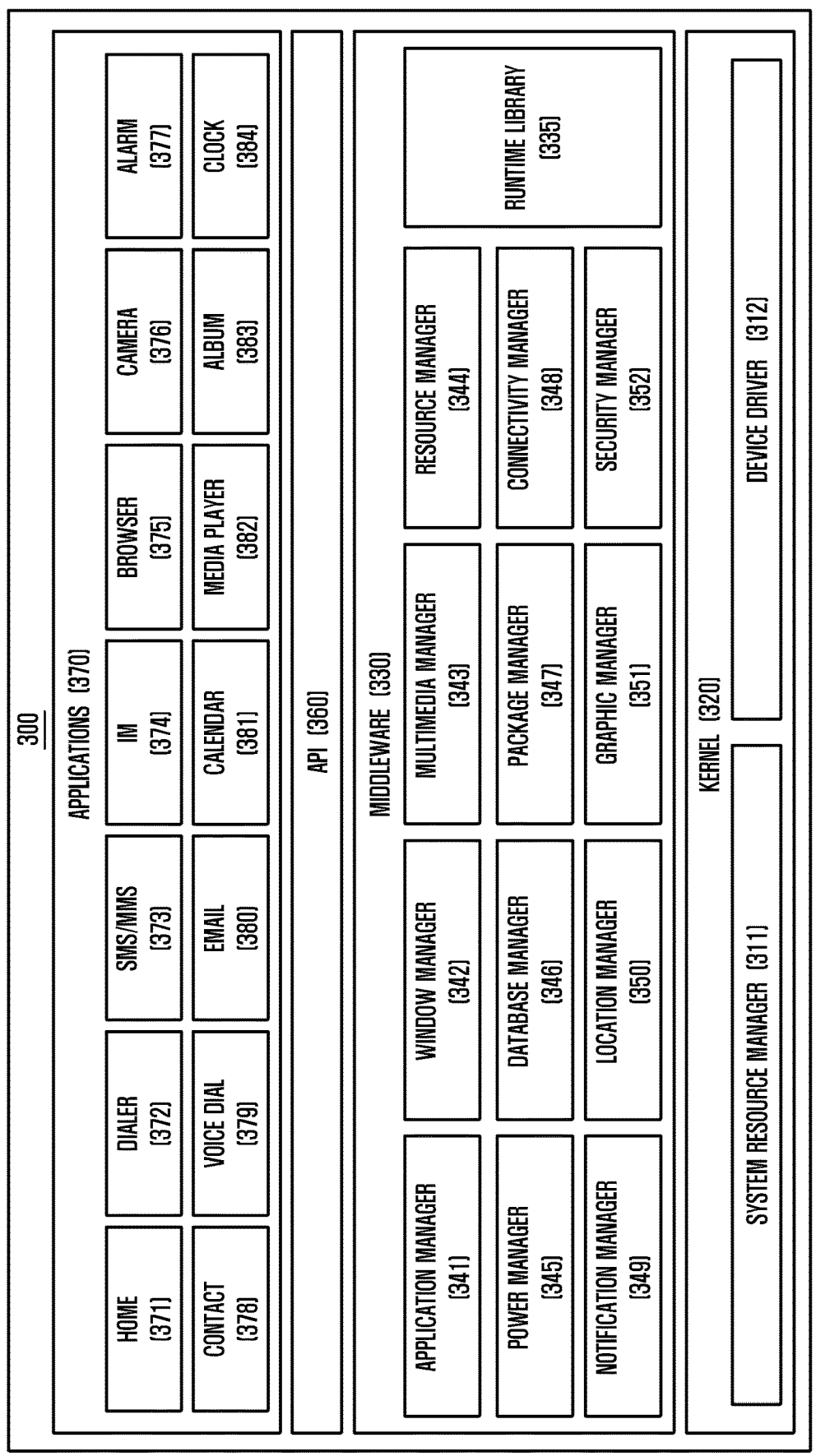
FIG. 3 is a block diagram illustrating an example program module according to various example embodiments of the present disclosure.

FIG. 3 is a block diagram illustrating an example configuration of a programming module 300 according to an example embodiment of the present disclosure.

The programming module 300 may be included (or stored) in the electronic device 101 (e.g., the memory 130) or may be included (or stored) in the electronic device 200 (e.g., the memory 230) illustrated in FIG. 1. At least a part of the programming module 300 may be implemented in software, firmware, hardware, or a combination of two or more thereof. The programming module 300 may be implemented in hardware (e.g., the hardware 200), and may include an OS controlling resources related to an electronic device (e.g., the electronic device 100) and/or various applications (e.g., an application 370) executed in the OS. For example, the OS may be Android, iOS, Windows, Symbian, Tizen, Bada, and the like.

Referring to FIG. 3, the programming module 300 may include a kernel 320, a middleware 330, an API 360, and/or the application 370.

The kernel 320 (e.g., the kernel 131) may include a system resource manager 311 and/or a device driver 312. The system resource manager 311 may include, for example, a process manager (not illustrated), a memory manager (not illustrated), and a file system manager (not illustrated). The system resource manager 311 may perform the control, allocation, recovery, and/or the like of system resources. The device driver 312 may include, for example, a display driver (not illustrated), a camera driver (not illustrated), a Bluetooth driver (not illustrated), a shared memory driver (not illustrated), a USB driver (not illustrated), a keypad driver (not illustrated), a Wi-Fi driver (not illustrated), and/or an audio driver (not illustrated). Also, according to an embodiment of the present disclosure, the device driver 312 may include an Inter-Process Communication (IPC) driver (not illustrated).

The middleware 330 may include multiple modules previously implemented so as to provide a function used in common by the applications 370. Also, the middleware 330 may provide a function to the applications 370 through the API 360 in order to enable the applications 370 to efficiently use limited system resources within the electronic device. For example, as illustrated in FIG. 3, the middleware 330 (e.g., the middleware 132) may include at least one of a runtime library 335, an application manager 341, a window manager 342, a multimedia manager 343, a resource manager 344, a power manager 345, a database manager 346, a package manager 347, a connectivity manager 348, a notification manager 349, a location manager 350, a graphic manager 351, a security manager 352, and any other suitable and/or similar manager.

The runtime library 335 may include, for example, a library module used by a complier, in order to add a new function by using a programming language during the execution of the application 370. According to an embodiment of the present disclosure, the runtime library 335 may perform functions which are related to input and output, the management of a memory, an arithmetic function, and/or the like.

The application manager 341 may manage, for example, a life cycle of at least one of the applications 370. The window manager 342 may manage GUI resources used on the screen. The multimedia manager 343 may detect a format used to reproduce various media files and may encode or decode a media file through a codec appropriate for the relevant format. The resource manager 344 may manage resources, such as a source code, a memory, a storage space, and/or the like of at least one of the applications 370.

The power manager 345 may operate together with a Basic Input/Output System (BIOS), may manage a battery or power, and may provide power information and the like used for an operation. The database manager 346 may manage a database in such a manner as to enable the generation, search and/or change of the database to be used by at least one of the applications 370. The package manager 347 may manage the installation and/or update of an application distributed in the form of a package file.

The connectivity manager 348 may manage a wireless connectivity such as, for example, Wi-Fi and Bluetooth. The notification manager 349 may display or report, to the user, an event such as an arrival message, an appointment, a proximity alarm, and the like in such a manner as not to disturb the user. The location manager 350 may manage location information of the electronic device. The graphic manager 351 may manage a graphic effect, which is to be provided to the user, and/or a user interface related to the graphic effect. The security manager 352 may provide various security functions used for system security, user authentication, and the like. According to an embodiment of the present disclosure, when the electronic device (e.g., the electronic device 100) has a telephone function, the middleware 330 may further include a telephony manager (not illustrated) for managing a voice telephony call function and/or a video telephony call function of the electronic device.

The middleware 330 may generate and use a new middleware module through various functional combinations of the above-described internal element modules. The middleware 330 may provide modules specialized according to types of OSs in order to provide differentiated functions. Also, the middleware 330 may dynamically delete some of the existing elements, or may add new elements. Accordingly, the middleware 330 may omit some of the elements described in the various embodiments of the present disclosure, may further include other elements, or may replace the some of the elements with elements, each of which performs a similar function and has a different name.

The API 360 (e.g., the API 133) is a set of API programming functions, and may be provided with a different configuration according to an OS. In the case of Android or iOS, for example, one API set may be provided to each platform. In the case of Tizen, for example, two or more API sets may be provided to each platform.

The applications 370 (e.g., the applications 134) may include, for example, a preloaded application and/or a third party application. The applications 370 (e.g., the applications 134) may include, for example, a home application 371, a dialer application 372, a Short Message Service (SMS)/Multimedia Message Service (MMS) application 373, an Instant Message (IM) application 374, a browser application 375, a camera application 376, an alarm application 377, a contact application 378, a voice dial application 379, an electronic mail (e-mail) application 380, a calendar application 381, a media player application 382, an album application 383, a clock application 384, and any other suitable and/or similar application.

At least a part of the programming module 300 may be implemented by instructions stored in a non-transitory computer-readable storage medium. When the instructions are executed by one or more processors (e.g., the one or more processors 210), the one or more processors may perform functions corresponding to the instructions. The non-transitory computer-readable storage medium may be, for example, the memory 220. At least a part of the programming module 300 may be implemented (e.g., executed) by, for example, the one or more processors 210. At least a part of the programming module 300 may include, for example, a module, a program, a routine, a set of instructions, and/or a process for performing one or more functions.

Names of the elements of the programming module (e.g., the programming module 300) according to an embodiment of the present disclosure may change depending on the type of OS. The programming module according to an embodiment of the present disclosure may include one or more of the above-described elements. Alternatively, some of the above-described elements may be omitted from the programming module. Alternatively, the programming module may further include additional elements. The operations performed by the programming module or other elements according to an embodiment of the present disclosure may be processed in a sequential method, a parallel method, a repetitive method, or a heuristic method. Also, some of the operations may be omitted, or other operations may be added to the operations.

In various embodiments of the present disclosure, an electronic device is implemented to include: a communication circuit; a display; an input device which is configured with the display or separated from the display; a processor electrically connected to the communication circuit, the display, and the input device; and a memory, electrically connected to the processor, for storing instructions and a program for a web-browser. The memory stores instructions enabling the processor to: display the web browser on the display, based on a user's first input applied to the input device; receive data of a web page via the communication circuit; display the web page on the display, via the web browser; receive a user's second input for creating at least one action related to the web page, via the input device; store, in the memory, information related to at least one action, as part of a web page browsing history related to the web browser; and provide the display with at least one notification related to at least one action, using the web browser. At least one action includes: an action for executing an automatically linkify function, using information related to at least one object displayed on the web page. At least one action includes: an action for executing at least one of the following: select, copy, share, dictionary search, web search, and translate, with respect to at least one object displayed on the web page. At least one action includes: an action for capturing part or the entire screen displaying the web page. At least one action includes: an action for bookmarking the web page. The memory stores instructions enabling the processor to: store, in the memory, the cumulative number of visits to the web page and a duration of time spent on the web page, as part of a web page browsing history related to the web browser. The memory stores instructions enabling the processor to: store, in the memory, information regarding a program executing the link of the web page, as part of a web page browsing history related to the web browser. The memory stores instructions enabling the processor to: map information related to at least one action to each history of the web page; and store the mapping result in the memory. The notification includes: a function for categorizing a history of the web browser, based on information related to at least one action, and a function for providing the categorization result. The notification includes: a function for providing a screen for selecting at least one action from the history of the web browser, and a function for providing a history searched according to at least one action that a user selected on the screen. The notification includes: a function for classifying histories of the web browser into tabs, according to the information related to at least one action, and providing the classified results. The notification includes: a function for displaying, on a screen providing histories of the web browser, icons at locations set according to the histories, based on the information related to at least one action.

In the following description, an electronic device according to various example embodiments of the present disclosure is explained in greater detail.

Figure 4:
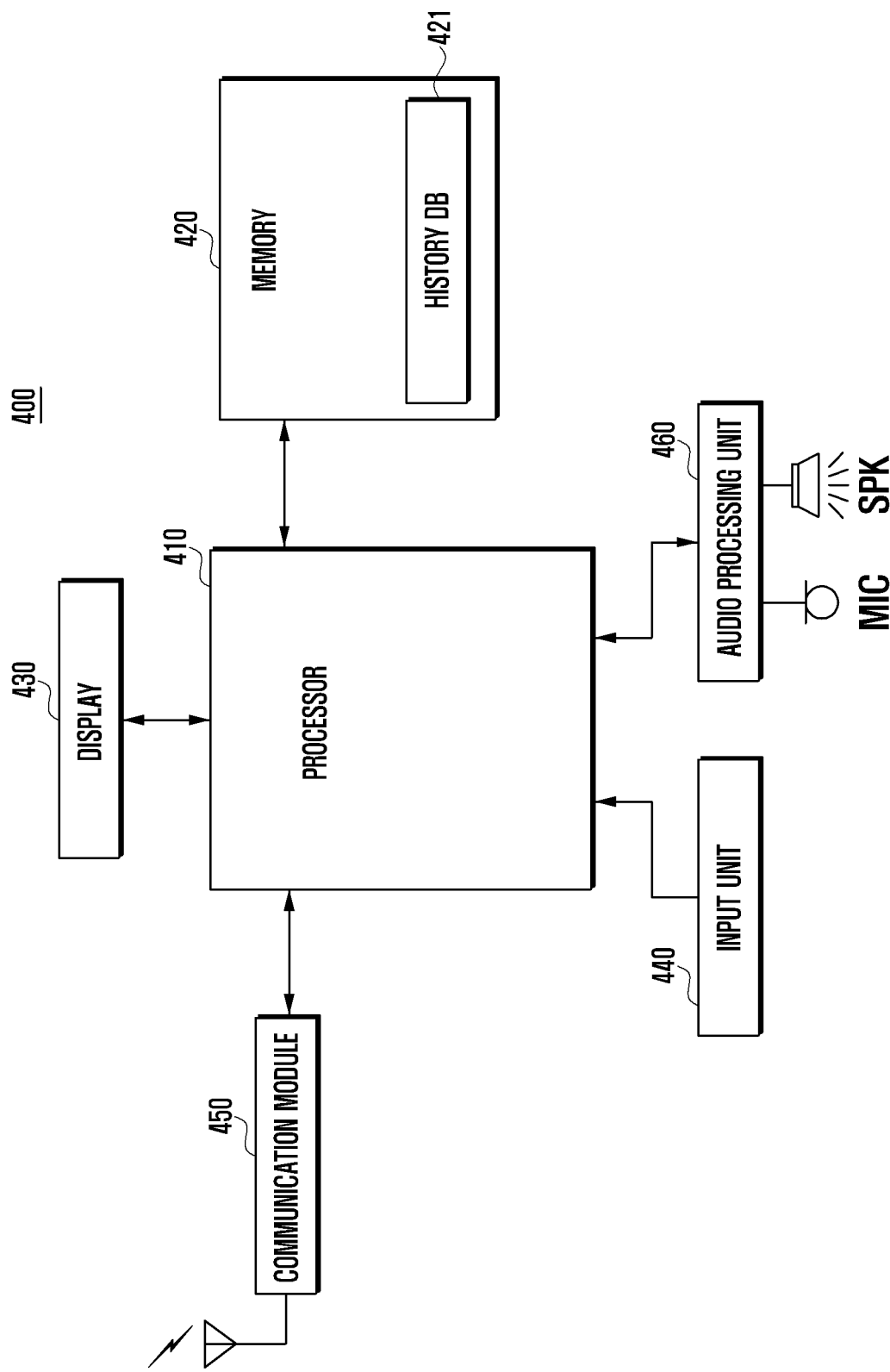
FIG. 4 is a block diagram illustrating an example electronic device according to various example embodiments of the present disclosure.

FIG. 4 is a block diagram illustrating an example electronic device according to various example embodiments of the present disclosure.

The electronic device 400 is capable of including part or all of the components of the electronic device 201 illustrated in FIG. 2. For example, the electronic device 400 may include, a processor (e.g., including processing circuitry) 410, a memory 420, a display 430, an input unit (e.g., including input circuitry) 440, a communication module (e.g., including communication circuitry) 450 and an audio processing unit (e.g., including audio processing circuitry) 460.

The processor 410 (e.g., processor 210) may include various processing circuitry configured to control operations of the electronic device 400 and signals flowing among the components in the electronic device 400. The processor 410 is also capable of processing data in the electronic device 400. The processor 410 may be implemented using various processing circuitry, such as, for example, and without limitation, a dedicated processor, a central processing unit (CPU), a micro-processor unit (MPU), an application processor (AP), etc. In the example embodiment, the processor 410 is capable of including web browsers.

The processor 410 is capable of controlling a web browser based on a web page output request and storing web browsing history information. The processor 410 is capable of displaying browsing history information, in a hierarchical manner (tree structure), according to a history information display request.

The web browser is capable of parsing and rendering web pages created by a web language, such as a hypertext markup language (HTML), an extensible markup language (XML), etc.

In an example embodiment, the processor 410 is capable of analyzing link information regarding a web page requested for access. For example, the processor 410 is capable of analyzing the document object model (DOM) for link information received from a web browser and collecting the information. The processor 410 is capable of collecting information regarding part or all of the web page sources. For example, a web page includes <html> tag, <head> tag, <body> tag, <div> tag, etc.

In an example embodiment, the processor 410 is capable of logging the collected additional information and creating history information based on the logging information. In this example, the processor 410 is capable of structuring and storing the created history information. For example, the processor 410 is capable of selectively storing time of access to a web page, information contained in web pages, and information related to an action according to a user's input applied to web pages.

In an example embodiment, the processor 410 is capable of visualizing and displaying stored history information based on a history information display request. For example, the processor 410 is capable of processing and outputting history information in the form of an image. For example, the processor 410 is capable of providing information related to an action created according to a user's input, in the form of icon, on the right of each history. The processor 410 is capable of outputting a keyword entry field according to a history information search request, and searching for history information containing a keyword that the user entered in the keyword entry field. As described above, various example embodiments of the present disclosure are capable of visualizing and displaying history information hierarchically, so that the user can easily view a history of visited web pages.

The memory 420 (e.g., memory 230) is capable of storing an operating system (OS) of the electronic device 400. The memory 420 is also capable of storing application programs for options functions, such as an audio reproduction function, image or moving image reproduction functions, a broadcast reproduction function, etc. The memory 420 is further capable of storing user data, data transmitted/received in communication, etc. For example, the memory 420 is capable of storing video files, game files, audio files, movie files, etc. In an embodiment, the memory 420 is capable of storing history information. The history information may include URLs of websites that the user visited or accessed and information related to websites. The memory 420 may also include a history DB 421.

The display 430 (e.g., display 260) is capable of displaying menus of the electronic device 400 and information input by the user or information provided to the user. For example, the display 430 displays various types of screens according to the operations of the electronic device 430, e.g., an idle screen (home screen), menu screens, a message writing screen, a call screen, a schedule screen, a contact list screen, a screen for displaying web pages, etc. The display 430 is capable of displaying history information visually. The display 430 may be implemented with a liquid crystal display (LCD), organic light emitting diode (OLED), active matrix organic light emitted diode (AMOLED), or the like, but is not limited thereto. The display 430 may be implemented with a touch-screen. In this example, the display 430 is also capable of serving as an input unit 440.

The input unit 440 (e.g., input device 250) may include various input circuitry including, for example, input keys and function keys that receive numerical or alphabetical information and set and control a variety of functions in the electronic device 400. In an example embodiment, the input unit 440 is capable of transferring, to the processor 410, an input signal for requesting access to a website, an input signal for activating a link included in a website, an input signal for requesting the display of history information, an input signal for requesting the display of a number items of linked history information in an extended or overlaying mode, an input signal for requesting the history search, an input signal for requesting a website access end, etc. The input unit 440 may be implemented with various input circuitry, such as, for example, and without limitation, one or more of a button-type touch pad, a ball joystick, an optical joystick, a wheel key, a touch key, a touch pad, a touch-screen, etc., or a combination thereof.

The communication module 450 (e.g., communication module 220) may include various communication circuitry capable of establishing, with a base station, a communication channel for calls (e.g., a voice/video call), a data communication channel for transmission of data, etc. The communication module 450 may include an RF transmitter for up-converting the frequency of signals to be transmitted and amplifying the signals, an RF receiver for low-noise amplifying received RF signals and down-converting the frequency of the received RF signals, a unit for separating signals into reception signals and transmission signals, etc. In an example embodiment, the communication module 450 is capable of transmitting a signal for requesting access to a website to a corresponding web server, and receiving web pages requested for access from the web server. When the electronic device 400 is not equipped with a wireless communication function, it may be configured without the communication module 450. The electronic device 400 may request access to a website for web pages, and receive the requested web pages therefrom, in wired communication.

The audio processing unit 460 (e.g., audio module 280) may be implemented with various audio processing circuitry components for encoding and decoding audio signals to be transmitted or received audio signals. The audio processing unit 460 may include various audio processing circuitry including an audio codec, audio amplifier, etc. The audio processing unit 460 is connected to a microphone and a speaker. The audio processing unit 460 is capable of converting analog audio signals input via the microphone into digital audio signals to create digital audio data, and transferring the data to the processor 410. The audio processing unit 460 is capable of converting digital audio signals output from the processor 410 into analog audio signals and outputting the analog audio signals via the speaker. The audio processing unit 460 is also capable of outputting audio signals created in the electronic device 400 via the speaker. For example, the audio processing unit 460 is capable of outputting audio signals created according to the playback of mp3 files, video files, etc., via the speaker.

In various example embodiments of the present disclosure, a method of managing history information in an electronic device is implemented to include: displaying a web browser on a display, based on a first input (e.g., input by a user) applied to an input device; receiving data of a web page via a communication circuit; displaying the web page on the display, via the web browser; receiving a second input (e.g., input by a user) for creating at least one action related to the web page, via the input device; storing, in a memory, information related to at least one action, as part of a web page browsing history related to the web browser; and providing the display with at least one notification related to at least one action, using the web browser. The operation of storing information includes: storing, in the memory, information related to an action for executing an automatically linking or linkify function, as information related to at least one action, using information related to at least one object displayed on the web page. The operation of storing information includes: storing, in the memory, information related to an action for executing at least one of the following: select, copy, share, dictionary search, web search, and translate, with respect to at least one object displayed on the web page, as information related to at least one action. The operation of storing information includes: storing, in the memory, information related to an action for capturing part or the entire screen displaying the web page, as information related to at least one action. The operation of storing information includes: storing, in the memory, information related to an action for bookmarking the web page, as information related to at least one action. The method further includes: storing, in the memory, the cumulative number of visits to the web page and a duration of time spent on the web page, as information related to at least one action. The method further includes: storing, in the memory, information regarding a program executing the link of the web page, as part of a web page browsing history related to the web browser. The operation of storing information includes: mapping information related to at least one action to each history of the web page, and storing the mapping result in the memory. The operation of providing at least one notification includes: categorizing a history of the web browser, based on information related to at least one action; and providing the categorization result. The operation of providing at least one notification includes: providing a screen for selecting at least one action from the history of the web browser; and providing a history searched according to at least one action that a user selected on the screen. The operation of providing at least one notification includes: classifying histories of the web browser into tabs, according to the information related to at least one action; and providing the classified results. The operation of providing at least one notification includes: displaying, on a screen providing histories of the web browser, icons at locations set according to the histories, based on the information related to at least one action.

Figure 5:
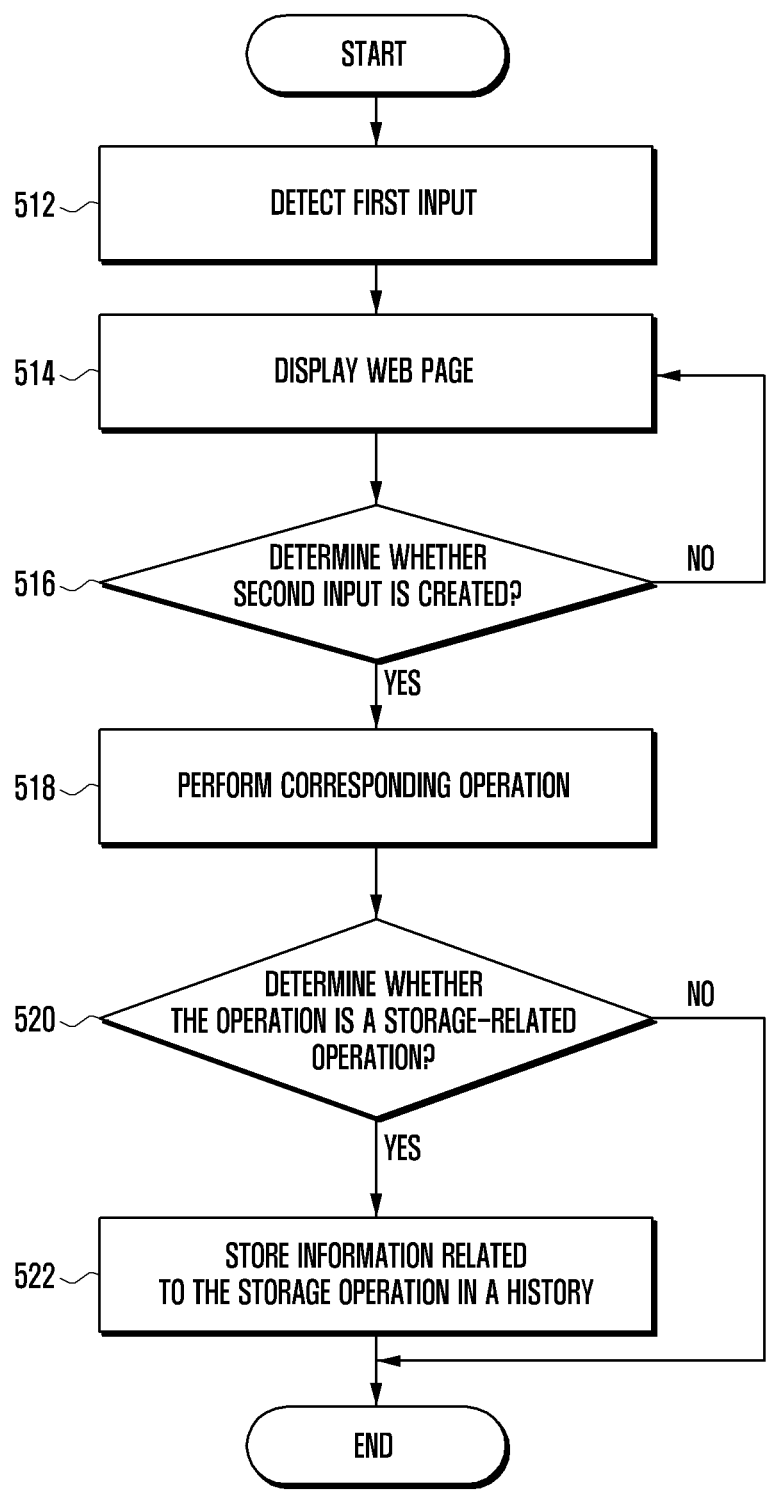
FIG. 5 is a flowchart illustrating an example method of managing history information in an electronic device according to various example embodiments of the present disclosure.

FIG. 5 is a flowchart illustrating an example method of managing history information in an electronic device according to various example embodiments of the present disclosure.

With reference to FIG. 5, the electronic device detects an input (e.g., user input) that occurred on a web page, and performs the following operations.

The processor 410 is capable of detecting a first input in operation 512. For example, an example of a user' first input is an action for displaying a web page.

The processor 410 is capable of displaying a web page based on the first input in operation 514. For example, the processor 410 is capable of controlling: the display 430 to display a web browser; and the communication module to receive web page data from the outside. The processor 410 is capable of controlling the display 430 to display a web page based on the received web page data.

The processor 410 is capable of determining whether a second input (e.g. a user input) is created in operation 516. When a second input is not created in operation 516, the processor 410 returns to operation 514 and displays the web page.

On the other hand, when a user's second input is created in operation 516, the processor 410 is capable of performing an operation corresponding to the second input in operation 518. Examples of an operation corresponding to the second input are an operation for scrolling a web page screen, an operation for increasing or decreasing the size of a web page screen, an operation for entering characters/letters, etc. The second input may be an action (operation) for executing an automatically linkify function, using information related to at least one object displayed on the web page. The second input may be an action (operation) for executing a specified function (operation), e.g., selection, copy, sharing, looking up/out in dictionaries, web-search, translation, etc., with respect to at least one object displayed on the web page.

The processor 410 is capable of determining whether an operation performed according to the second input is a storage-related operation in operation 520. For example, when the processor 410 executes the automatically linkify function, using at least one object displayed on the web page, based on the second input, it ascertains that the operation is a storage-related operation. When the processor 410 performs an action (operation) for executing at least one of the following: select, copy, share, dictionary search, web search, and translate, with respect to at least one object displayed on the web page, based on the user's second input, it ascertains that the operation is a storage-related operation.

When an operation performed based on the second input is a storage-related operation in operation 520, the processor 410 is capable of storing information related to the storage-related operation in a history in operation 522. For example, when an operation performed according to the user's second input includes an action (operation) for executing an automatically linkify function, using at least one object displayed on the web page, the processor 410 is capable of mapping the operation to a history and storing the mapping result. When an operation performed based on the second input includes an action (operation) for executing at least one of the following: select, copy, share, dictionary search, web search, and translate, with respect to at least one object displayed on the web page, based on the user's second input, the processor 410 is capable of mapping at least one action to a history and storing the mapping result.

The processor 410 is capable of measuring a duration of time spent on a web page, mapping the measured duration to a history, and storing the mapping result in operation 522. The processor 410 is capable of counting the cumulative number of visits to a web page, mapping the counted cumulative number to a history, and storing the mapping result in operation 522.

Figure 6A:
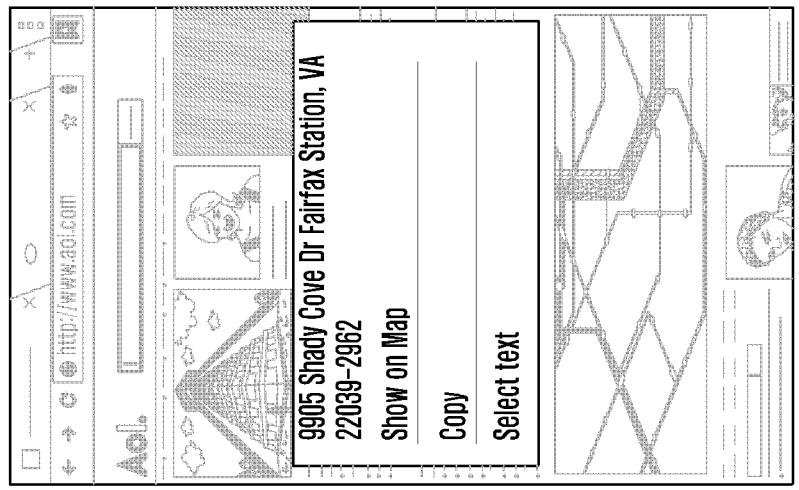
FIGS. 6A, 6B and 6C are diagrams illustrating an example function for using information regarding objects displayed on a web page on an electronic device according to an example embodiment of the present disclosure.
Figure 6B:
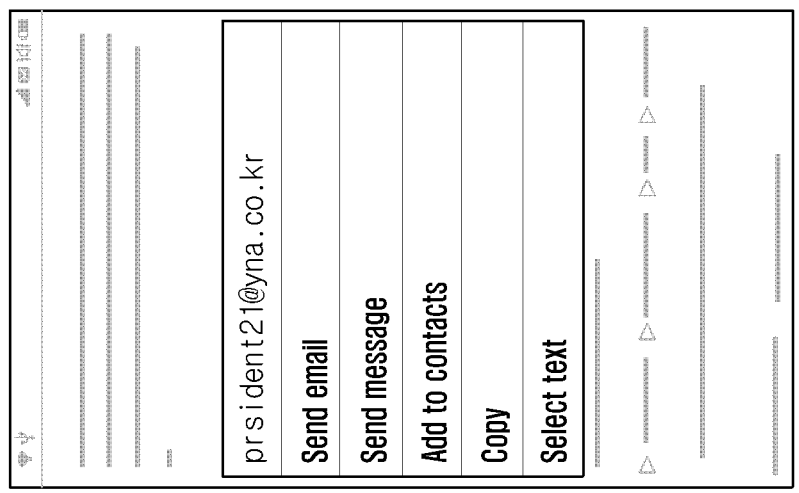
Figure 6C:
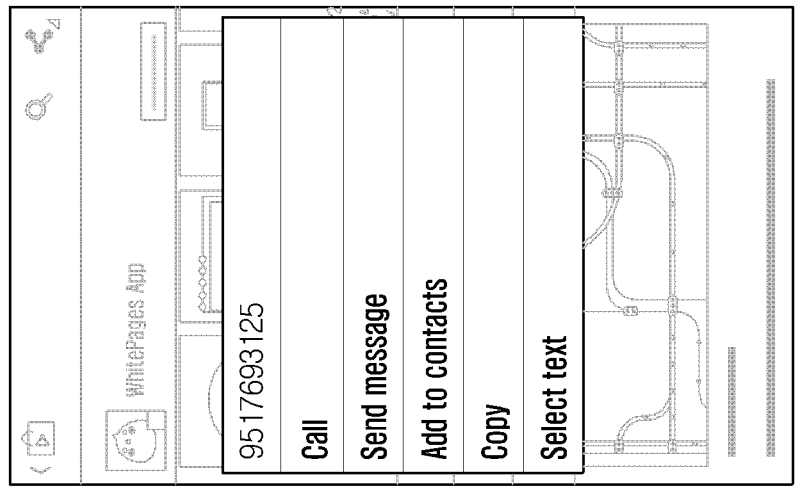

FIGS. 6A, 6B and 6C are diagrams illustrating an example function of using information regarding objects displayed on a web page on an electronic device according to an example embodiment of the present disclosure. For example, FIG. 6A is a diagram illustrating an information using function when a specified web page includes a contact, FIG. 6B is a diagram illustrating an information using function when a specified web page includes an email address, and FIG. 6C is a diagram illustrating an information using function when a specified web page includes a postal address.

With reference to FIG. 6A, the processor 410 is capable of providing menus related to a contact, using information regarding objects displayed on a web page. The contact-related menus may include a function for making a call directly to the detected contact, a function for sending a message, etc., using information in the object. When an operation is performed to make a call to or to send a message to a contact detected using information regarding objects displayed on a web page, the processor 410 ascertains that the operation is a storage-related operation.

With reference to FIG. 6B, the processor 410 is capable of providing menus related to an email, using information regarding objects displayed on a web page. The email-related menus may include a function for sending an email to the detected email address, etc., using information in the object. When an operation is performed to send an email to an email address detected using information regarding objects displayed on a web page, the processor 410 ascertains that the operation is a storage-related operation.

With reference to FIG. 6C, the processor 410 is capable of providing menus related to a postal address, using information regarding objects displayed on a web page. The mail-related menus may include a function for showing a mark with the detected postal address on a map, etc., using information in the object. When an operation is performed to search a map for the detected postal address using information regarding objects displayed on a web page, the processor 410 ascertains that the operation is a storage-related operation.

Figure 7:
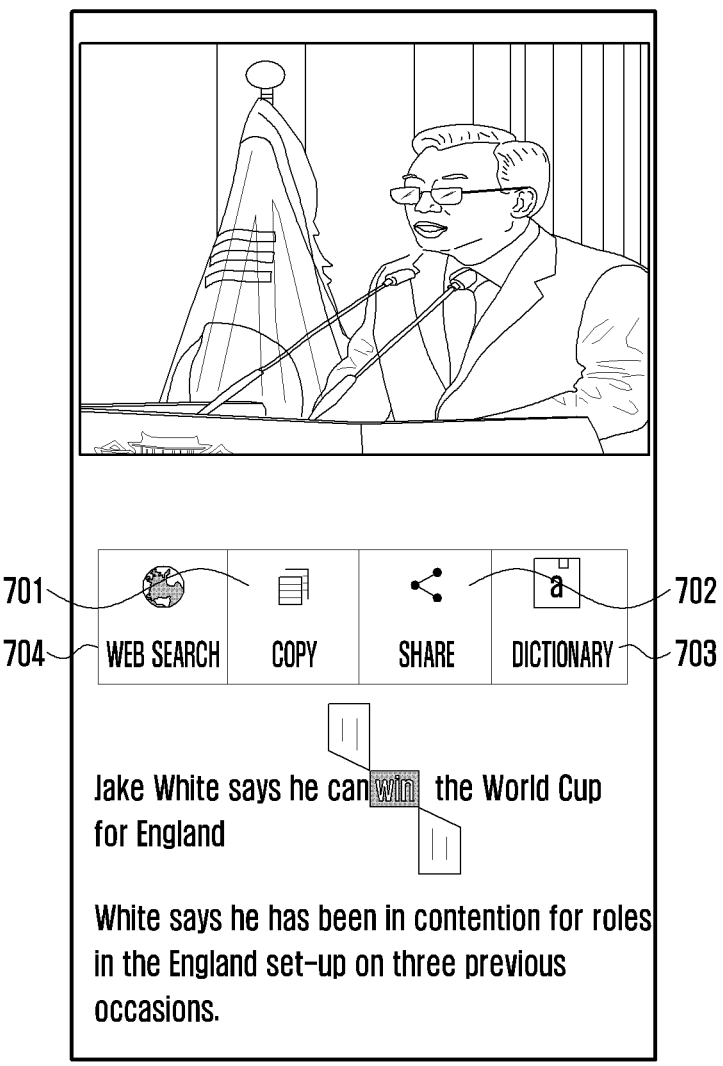
FIG. 7 is a diagram illustrating an example method of processing objects displayed on a web page in an electronic device according to an example embodiment of the present disclosure.

FIG. 7 is a diagram illustrating an example method of processing objects displayed on a web page in an electronic device according to an example embodiment of the present disclosure.

With reference to FIG. 7, the processor 410 is capable of providing menus related to objects (e.g., text or images) displayed on a web page. The menus may include copy 701, share 702, dictionary search 703, web search 704, etc. When the created action (operation) is, for example, at least one of the following: select, copy, share, dictionary search, web search, and translate, with respect to at least one object displayed on the web page, the processor ascertains that the operation is a storage-related operation.

In an example embodiment, the storage-related operation may include at least one of the following: select, copy, share, dictionary search, web search, and translate, with respect to at least one object displayed on the web page, In an example embodiment, the storage-related operation may include an action for capturing part or the entire screen displaying the web page. For example, when an operation (action) for capturing a web page screen in loading is performed, the processor is capable of updating the capture operation in a history DB 421 of a corresponding web page.

In an example embodiment, the storage-related operation may include an action for bookmarking the web page. For example, when an action (operation) for bookmarking a corresponding web page address is created, the processor is capable of updating the operation in a history DB 421 of a corresponding web page.

In an example embodiment, the processor is capable of storing a web page, along with the cumulative number of visits to the web page and a duration of time spent on the web page, in a history of the web page. The processor 410 is capable of determining whether information included in the web page is stored in the history DB 421 of the memory 420. For example, the processor 410 is capable of analyzing URL information regarding the web page and determining whether the web page has been visited based on the analysis. When information regarding the web page is stored in the memory 420, the processor 410 accumulates the number of visits to the web page and updates the history DB 421.

In an example embodiment, the processor is capable of storing information related to a program executing the web page in a history of the web page. For example, when the user executes a web page via a social networking service (SNS) application, the processor 410 is capable of storing a web page visit history and information regarding an SNS application executing a web page in a history.

FIG. 8 is a diagram illustrating an example method of storing a history of a web page in an electronic device according to an example embodiment of the present disclosure.

With reference to FIG. 8, the history DB 421 may be configured to include various information, e.g., address of web page, access time to web page, web page using time (web page visit duration), link program linking to a web page (the previous program), operations related to web page, etc.

Figure 9:
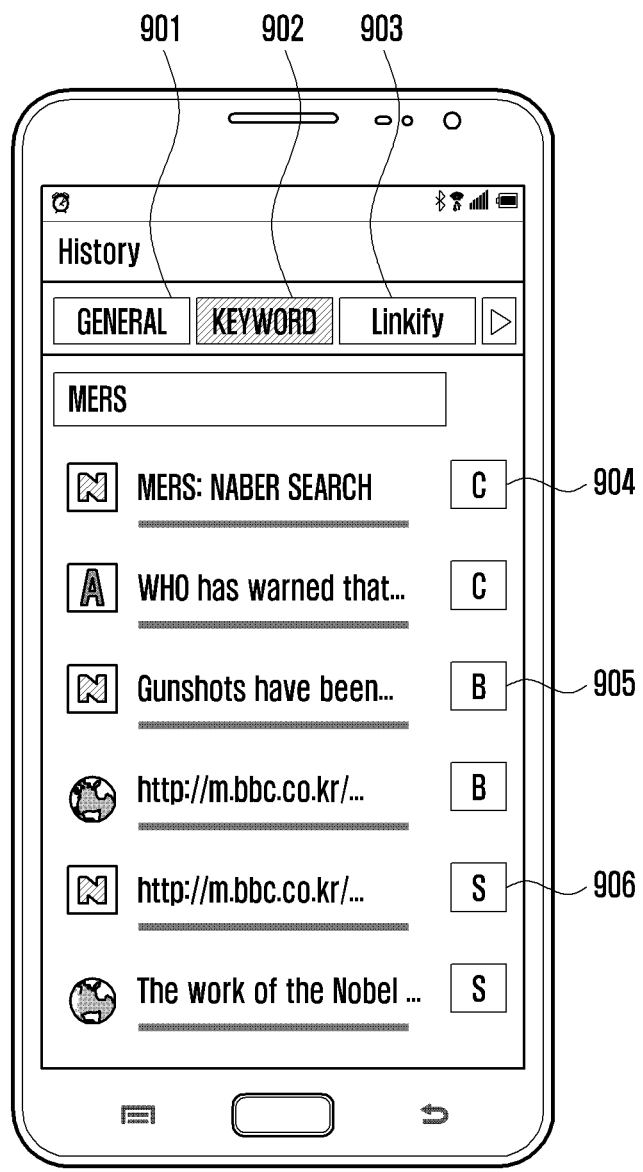
FIG. 9 is a diagram illustrating an example screen when an electronic device provides a history function, according to an example embodiment of the present disclosure.

FIG. 9 is a diagram illustrating an example screen when an electronic device provides a history function, according to an example embodiment of the present disclosure.

The history screen provides a general history tab 901, a history tab according to a keyword search form 902, and a history tab for sorting only an automatically linkify function 903. The general history tab 901 may include, for example, a title and an address of a web page. The processor 410 is capable of controlling the display to show, in at least part of each history, information regarding operations related to a corresponding web page, in icon forms 904, 905, and 906. In this example, the user can recognize that an action occurred in a corresponding web page, by only viewing the icons 904, 905, and 906 shown at the right of each history on the history screen.

For example, when a copy icon 904 appears at the right of a specified history, the user can recognize that a copy operation has been applied to a corresponding web page.

In an example embodiment, when the user selects a general history tab 901 via an input unit, the processor 410 is capable of displaying the history of a web browser in order of time. When the user selects a keyword history tab 902 via an input unit, the processor 410 is capable of displaying keyword results that the user entered into the keyword field in order of time. When the user selects an automatic linkify history tab 903 via an input unit, the processor 410 is capable of sorting only a browsing history executed based on, for example, an automatically linkify function from the web browser history that the user has accessed, and displaying the sorted result.

Figure 10:
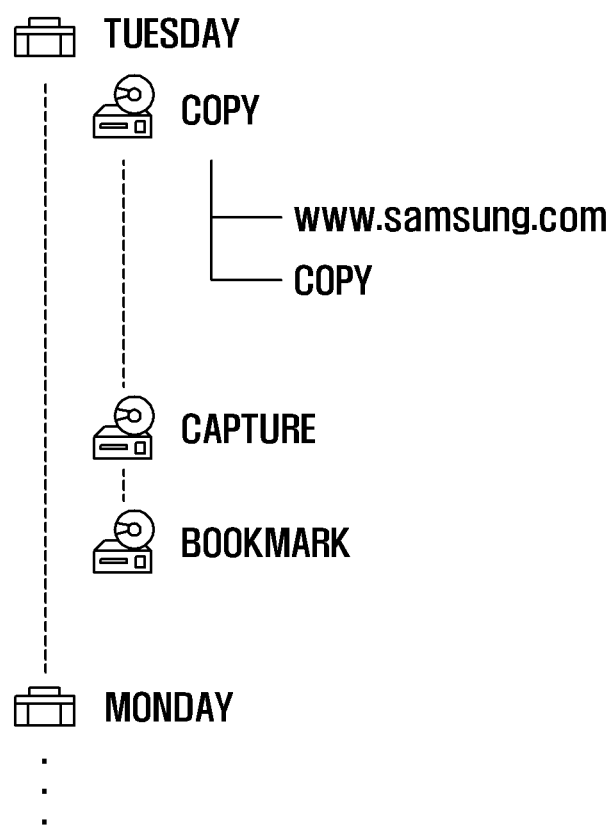
FIG. 10 is diagram illustrating an electronic device providing a history function, according to another example embodiment of the present disclosure.

FIG. 10 is a diagram illustrating an example screen when an electronic device provides a history function, according to another example embodiment of the present disclosure.

With reference to FIG. 10, a history screen may be shown in a folder structure in tree view. For example, a history screen arranges history information in order of date and time, and categorizes history information accessed on a corresponding date, according to storage-related operations. As illustrated in FIG. 10, web pages that the user accessed on Tuesday are classified into copy, capture, and bookmark items, and the bookmark item includes a history of a web page that the user accessed on Tuesday and that the user copied an object from/in.

FIG. 11 is a diagram illustrating an example screen when an electronic device provides a history search function, according to an example embodiment of the present disclosure.

The electronic device 400 is capable of providing a detailed search function for a history. With reference to FIG. 11, the history search screen may include user selection menus for selecting items of information mapped to each history in a history DB, e.g., access time, visits, visit duration, a link program (a program executing a link of the web page), storage-related operations (e.g., automatic linkify, copy, capture, etc.), etc.

As described above, various example embodiments of the present disclosure are capable of storing, as a history of web browsers, time information regarding access to web pages, information contained in web pages, and information regarding actions that occurred on web pages based on received inputs. The apparatus and method according to various example embodiments of the present disclosure is capable of easily searching for a history and increasing user convenience.

A programming module according to example embodiments of the present disclosure may include one or more of the aforementioned components or may further include other additional components, or some of the aforementioned components may be omitted. Operations executed by a module, a programming module, or other component elements according to various example embodiments of the present disclosure may be executed sequentially, in parallel, repeatedly, or in a heuristic manner. Further, some operations may be executed according to another order or may be omitted, or other operations may be added.

While the disclosure has been illustrated and described with reference to certain embodiments thereof, it will be understood by those skilled in the art that various changes in form and detail may be made therein without departing from the spirit and scope of the disclosure as defined by the appended claims.

What is claimed is:

1. An electronic device comprising:
   a communication circuit;
   a display;
   an input device comprising input circuitry configured with the display or separated from the display;
   a processor operatively coupled to the communication circuit, the display, and the input circuitry; and
   a memory configured to store instructions that, when executed by the processor, cause the processor to:
   display a web browser on the display, based on a first input applied to the input circuitry;
   receive data of a web page via the communication circuit;
   display the web page on the display, via the web browser;
   perform a function related to at least one object included in the web page based on receiving a second input via the input circuitry;
   store, in the memory, information related to the function, as part of a web page browsing history related to the web browser; and
   display at least one notification corresponding to the function along with the web page browsing history.

2. The electronic device of claim 1, wherein the function comprises:
   a function of executing a link to the at least one object displayed on the web page.

3. The electronic device of claim 1, wherein the function comprises at least one of:
   a function for executing at least one of: select, copy, share, dictionary search, web search, and translate, with respect to the at least one object displayed on the web page,
   a function of capturing part or the entire screen displaying the web page, or
   a function of bookmarking the web page.

4. The electronic device of claim 1, wherein the instructions cause the processor to:
   store, in the memory, a cumulative number of visits to the web page or a duration of time spent on the web page, as part of the web page browsing history related to the web browser.

5. The electronic device of claim 1, wherein the instructions cause the processor to:
   store, in the memory, information regarding a program executing a link of the web page, as part of the web page browsing history related to the web browser.

6. The electronic device of claim 1, wherein the instructions cause the processor to:
   map the information related to the function on the web page on which the function is performed, and store the mapping result in the memory.

7. The electronic device of claim 1, wherein the instructions cause the processor to:
   categorize the web page browsing history based on the information related to the function, and provide the categorization result.

8. The electronic device of claim 1, wherein the instructions cause the processor to:
   provide a screen for selecting at least one function from the web page browsing history, and provide a searched web page browsing history based on at least one function selected on the screen.

9. The electronic device of claim 1, wherein the instructions cause the processor to:
   classify the web page browsing history into tabs, based on the information related to the function, and providing the classified results.

10. A method of managing history information in an electronic device, the method comprising:
    displaying a web browser on a display, based on a first input applied to an input device;
    receiving data of a web page via a communication circuit;
    displaying the web page on the display, via the web browser;
    performing a function related to at least one object included in the web page based on receiving a second input via the input device;
    storing, in a memory, information related to the function, as part of a web page browsing history related to the web browser; and
    displaying at least one notification corresponding to the function along with the web page browsing history.

11. The method of claim 10, wherein the storing the information comprises:
    storing, in the memory, information related to a function of executing a link to the at least one object displayed on the web page.

12. The method of claim 10, wherein the storing the information comprises at least one of:
    storing, in the memory, information related to a function for executing at least one of: select, copy, share, dictionary search, web search, and translate, with respect to the at least one object displayed on the web page;

storing, in the memory, information related to a function of capturing part of or the entire screen displaying the web page; or storing, in the memory, information related to a function of bookmarking the web page.

13. The method of claim 10, further comprising:
storing, in the memory, a cumulative number of visits to the web page or a duration of time spent on the web page, as the information related to the function.

14. The method of claim 10, further comprising:
storing, in the memory, information regarding a program executing a link of the web page, as part of the web page browsing history related to the web browser.

15. The method of claim 10, wherein the storing the information comprises:
mapping the information related to the function onto the web page on which the function is performed, and storing the mapping result in the memory.

16. The method of claim 10, further comprising:
categorizing the web page browsing history, based on the information related to the function; and
providing the categorization result.

17. The method of claim 10, further comprising:
providing a screen for selecting at least one function from the web page browsing history; and
providing a searched web page browsing history based on at least one function selected on the screen.

18. The method of claim 10, further comprising:
classifying the web page browsing history into tabs, based on the information related to the function; and
providing the classified results.

19. A non-transitory computer-readable recording medium storing instructions which, when executed, cause at least one processor of an electronic device to perform operations comprising:
displaying a web browser on a display, based on a first input applied to an input device;
receiving data of a web page via a communication circuit;
displaying the web page on the display, via the web browser;
performing a function related to at least one object included in the web page based on receiving a second input via the input device;
storing, in a memory, information related to the function as part of a web page browsing history related to the web browser; and
displaying at least one notification corresponding to the function along with the web page browsing history.

* * * * *